Oct. 3, 1933.    N. W. MORSE    1,928,841
METHOD OF AND MEANS FOR ATTACHING LUBRICANT FITTINGS
Filed May 3, 1929    3 Sheets-Sheet 1
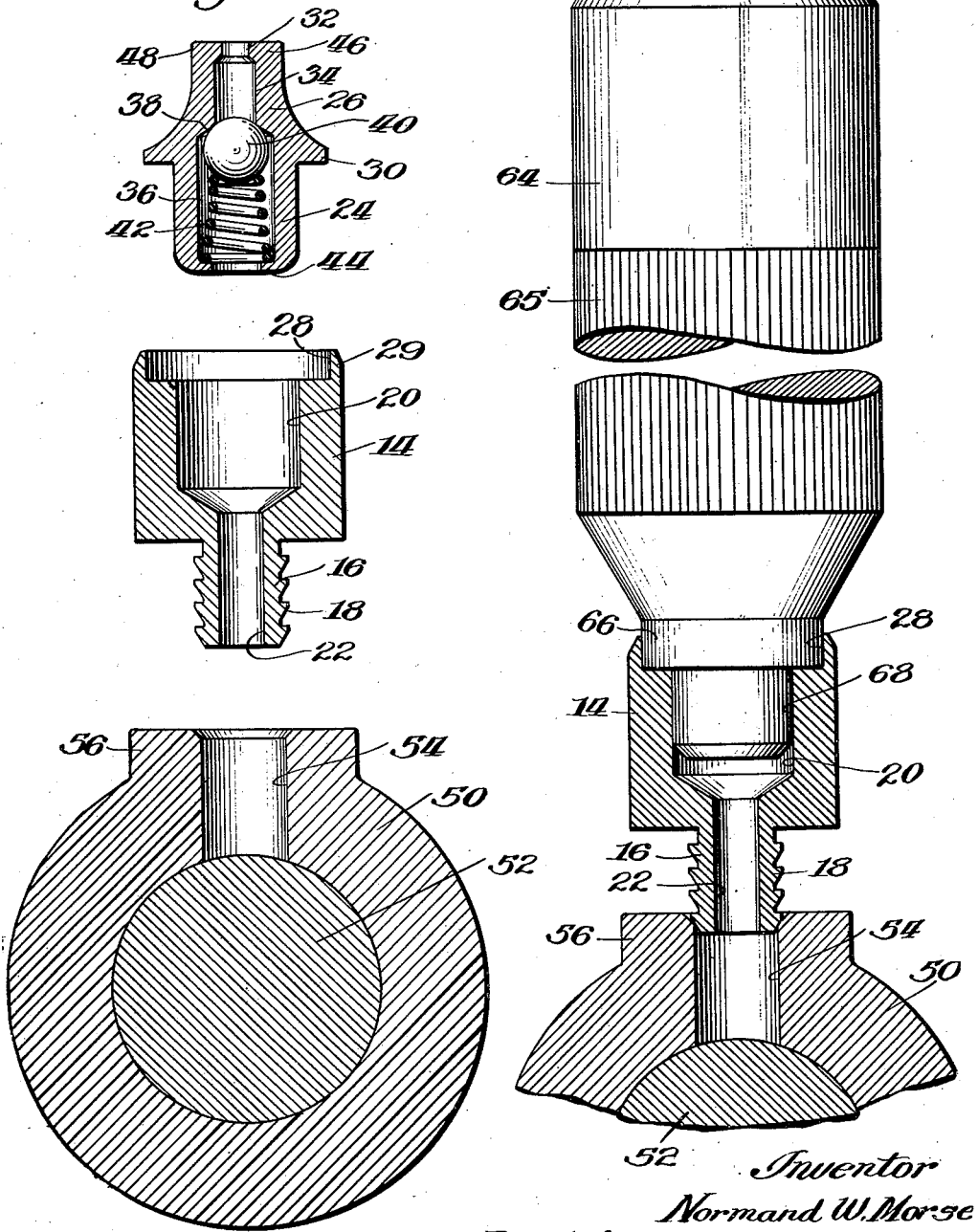
Inventor
Normand W. Morse
By Williams Bradbury
McCaleb Hinkle Attys.

Oct. 3, 1933.    N. W. MORSE    1,928,841
METHOD OF AND MEANS FOR ATTACHING LUBRICANT FITTINGS
Filed May 3, 1929    3 Sheets-Sheet 2

Inventor
Normand W. Morse.
By Williams, Bradbury
McCaleb & Hinkle Attys

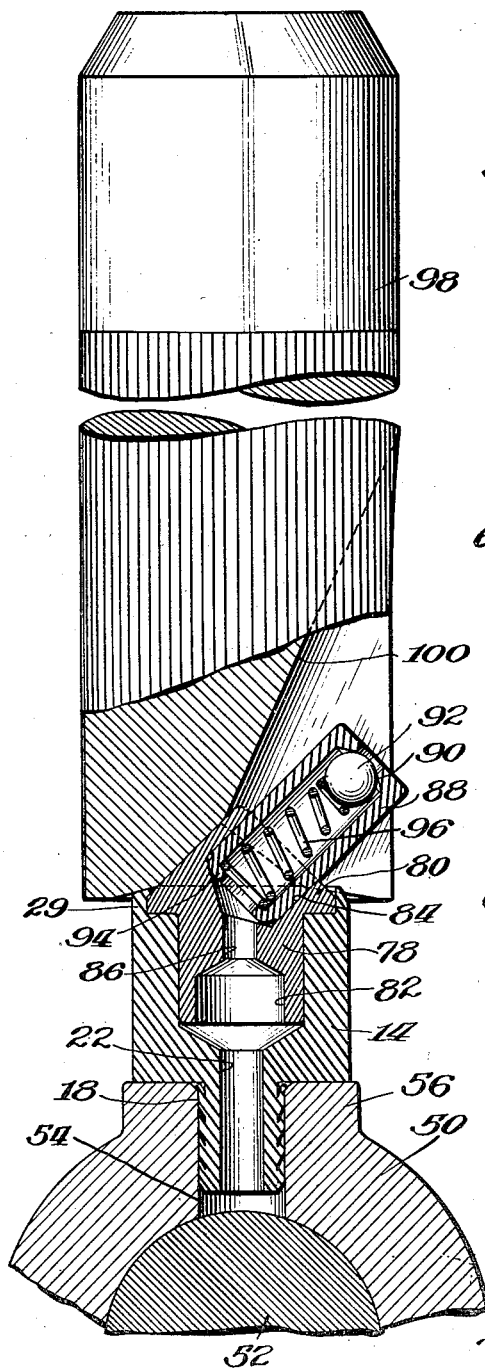

Patented Oct. 3, 1933

1,928,841

UNITED STATES PATENT OFFICE 1,928,841

METHOD OF AND MEANS FOR ATTACHING LUBRICANT FITTINGS

Normand W. Morse, Chicago, Ill., assignor to Alemite Corporation, Chicago, Ill., a corporation of Delaware Application May 3, 1929. Serial No. 360,056

9 Claims. (Cl. 29—157.1)

My invention relates generally to lubricating apparatus and more particularly to methods and means for attaching or securing lubricant receiving fittings in the oil holes of the bearings to be lubricated.

Lubricant receiving fittings of the so-called push type for cooperation with a lubricant compressor which is pushed against the fitting or nipple to force lubricant into a bearing to be lubricated are well known in the art. These nipples or fittings have customarily been screw threaded into the oil hole of the bearing. In some instances these nipples have been made with a smooth shank and the nipple driven into the untapped oil hole. Neither of these methods of attaching or securing the nipple to the bearing has been satisfactory in all instances. In many cases the oil hole is not drilled perfectly so that it is non-cylindrical and the drive fit nipple does not fit tightly, thus permitting lubricant to escape past the shank of the nipple. In other cases the threads of a tapped oil hole of a bearing become crossed or otherwise damaged, making it impossible to screw in a threaded nipple and thereby making it necessary to re-drill and tap the oil hole to a larger size before a nipple can be secured in place.

With the method of my invention a nipple may be easily and quickly secured in an oil hole in which the threads are damaged or in an unthreaded oil hole which is not perfectly cylindrical. The joint will be perfectly tight and prevent the escape of lubricant.

It is among the objects of my invention to provide a novel method of quickly and readily securing lubricant receiving fittings to bearings.

A further object is to provide an improved adapter or bushing for connecting lubricant receiving fittings to the oil holes of bearings.

Other objects will appear from the following description, reference being had to the accompanying drawings, in which Fig. 1 is a central vertical section of the fitting, adapter and bearing, prior to assembly;

Fig. 2 is a central vertical section showing the method of forcing the adapter into the oil hole of a bearing;

Fig. 5 is a similar view illustrating the method of securing an angle nipple in an adapter; and Figs. 6 to 11 inclusive, are elevations of various types of bushings.

Figure 3:
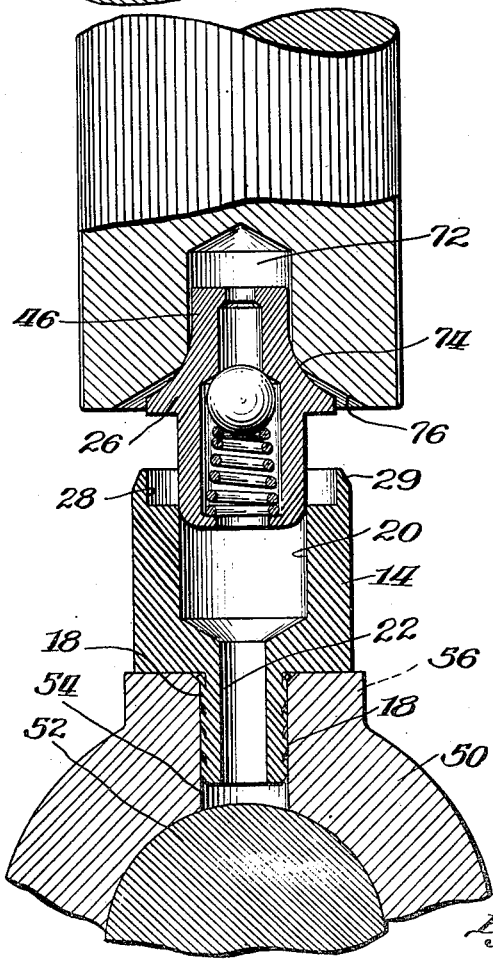
Fig. 3 is a similar view showing the adapter completely forced into the bearing and showing means for forcing the nipple into the adapter.

As best shown in Fig. 1, the bushing or adapter comprises a substantially cylindrical body 14 having a reduced diameter shank 16. The shank 16 has a plurality of annular ridges 18 substantially saw-toothed in cross section and pointing toward the body of the fitting.

The body 14 is centrally drilled to form a cylindrical recess 20 which communicates with a passageway 22 drilled through the shank 16. The cylindrical recess 20 is adapted to receive the shank 24 of a lubricant receiving nipple 26 and the body 14 of the bushing is counterbored at 28 to receive a flange 30 formed on the nipple 26. The portion of the body 14 around the counterbore 28 forms a relatively thin wall 29, the upper portion of which is of reduced thickness so that the wall may readily be deformed as will hereinafter appear.

The nipple 26 has a small opening 32 formed in its upper end, the opening communicating with a larger bore 34. The lower portion of the nipple has a cylindrical bore 36 and a beveled valve seat 38 for a ball check valve 40 which is held against the seat 38 to close the lower end of the bore 34 by a compression coil spring 42, the lower end of which rests upon a flange 44 spun inwardly at the lower end of the shank 24. The upper end of the nipple tapers gradually from the flange portion 30 to the tip 46 which has a dirt cutting circular edge 48 to make a sealing contact with the nozzle of a lubricant compressor, as is well known in the art and is fully described in the patent to O. U. Zerk, No. 1,475,980, granted December 4, 1923.

A conventional bearing 50 is shown as provided for a shaft 52 and has an oil hole 54 drilled in a boss 56 formed on the bearing.

The adapter or bushing shown in Fig. 1 is representative of a number of different sizes and types of adapters which are utilized in the method of my invention. The adapters are preferably made of three different types, of which the bushings 58, 59, 60, 61, 62 and 63 shown in Figs. 6 to 11, inclusive, respectively, are illustrative.

The adapter or bushing 58 is similar to bushing 14 except that its shank is of larger diameter and is what may be termed a shouldered long shank bushing. The bushing 60 is a shouldered short shank bushing, and the bushing 62 is a tapered long shank bushing. It will be understood that each of these bushings is made in a different size so as to be readily secured to different sized oil holes, the shouldered bushings being used where the oil hole is drilled and the tapered bushing being used where the oil hole is drilled and countersunk or where the oil hole is drilled at an angle. The short shank bushings are of course used wherever the bearing wall is of insufficient thickness to use the long shank bushing. All of these different types and sizes of bushings, however, have the same size recess 20 and counterbore 28 so as to be adapted to receive one size of fitting 26.

As shown in Fig. 2, the bushing body 14 is driven into the oil hole 54 of the bearing 50 by means of a drive tool 64, the handle portion of which is preferably striated as indicated at 65 and the lower end of which has a shoulder 66 adapted to fit into the counterbore 28 of the bushing body 14 and a beveled end cylindrical projection 68 which is adapted to fit in the recess 20 of the bushing.

The bushing body 14, selected for the attachment of the nipple to the bearing, has a shank, the outside diameter of which is slightly greater than the diameter of the oil hole of the bearing so that when the bushing is driven into the bearing, as shown in Fig. 2, the annular ridges 18 will be deformed to the shape (depending upon the conformation of the oil hole) shown in Fig. 3. The nipple is driven tightly into the bearing until its body (or corresponding shoulder) abuts against the boss of the bearing, as shown in Fig. 3.

The material of which the bushing body 14 is made is preferably softer than the material of which the bearing is made so that the ridges 18 will conform themselves to the shape of the oil hole and the bushing be tightly held in the bearing and escape of lubricant past the shank prevented.

After the bushing has thus been secured to the bearing, the nipple 26 is driven into the recess 20 by a tool 70, the body of which is striated to permit it to be easily gripped and the lower end of which has a cylindrical recess 72 to receive the tip 46 of the nipple. The lower end of the walls of this recess 72 flares outwardly at 74, to conform to the shape of the nipple, and terminates in a frusto-conical surface 76.

Figure 4:
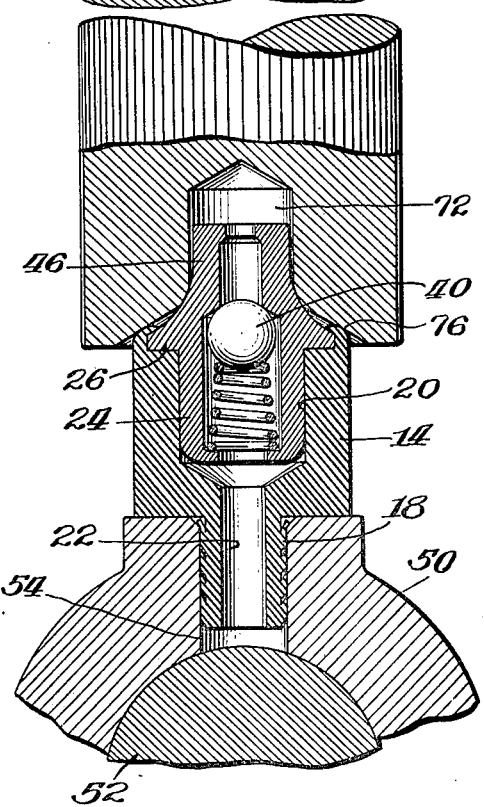
Fig. 4 shows the method of securing the nipple in the adapter.

As the nipple is being forced into the bushing so that its flange 30 rests in the counterbore 20, the frusto-conical surface 76 will engage the thin wall 29 and crimp it inwardly over the flange 30 of the nipple as shown in Fig. 4, thus permanently securing the nipple in the bushing.

In Fig. 5 I have shown an angle nipple being secured to a bushing in a manner similar to that above described. The angle nipple comprises a body 78 having a substantially conical head 80. The body and the head have bores 82 and 84 formed therein at an angle of approximately forty-five degrees, the bores communicating through a drilled passageway 86. A short tubular tip 88 having at its outer end an inwardly extending flange to form a seat 90 for a ball check valve closure 92, is secured in the bore 84, having a press fit therein. The inner end of the tip 88 has an inwardly turned flange 94 forming a seat for a compression coil spring 96 which normally holds the ball valve 92 against the seat 90.

A drive tool 98, generally similar to the tool 70, is used to force the nipple body 78 into the bushing body 14 and to crimp the thin wall 29 over the head 80 of the fitting. The drive tool 98 differs from the tool 70 only in that it is provided with a diagonally cut groove 100 of sufficient width to receive the nipple tip 88.

Having secured the nipples to the various bearings in the above-described manner, the bearings may be easily and quickly lubricated merely by successively applying a lubricant compressor of the well known push type to the tips of the nipples. The method of my invention thus makes it possible easily and quickly to attach lubricant receiving fittings to bearings which are made with an open oil hole irrespective of whether or not the hole is exactly cylindrical, and to such other bearings as have threaded oil holes in which the threads have become damaged. Furthermore, in following the method of my invention new machinery may be equipped with bearings, the oil holes of which are merely cored, and the operations of drilling or reaming and tapping are eliminated. By the selection of a bushing having a shank of proper size, the bushing may be substantially as tightly fitted into the oil hole of the bearing as if it were threaded in place.

By providing bushings having shanks of different diameters and lengths but all having fitting receiving recesses of the same size, it is possible to use one of two standard types of lubricant receiving fittings properly to equip any bearing for high pressure lubrication.

The invention is capable of wide variation within equivalent limits and I contemplate such variation as may be desirable or useful in the particular adaptation of the invention shown, or in its adaptation to other apparatus. I do not restrict myself in any unessential particulars, but what I claim and desire to secure by Letters Patent is:

1. The method of securing lubricant receiving nipples in unthreaded or poorly threaded oil holes of bearings which consists in driving into the oil holes of the bearings recessed bushings having portions of their shanks slightly larger than the oil holes, driving the shanks of nipples into the recesses of the bushings, and crimping portions of the bushings over portions of the nipples.

2. The method of securing nipples of standard size to bearings having oil holes of different sizes which comprises driving into the oil holes of the bearings bushings having shanks of slightly larger diameter than the oil holes of the bearings into which they are to be driven and having recesses of a standard size, driving standard lubricant receiving nipples into said recesses of said bushings, and bending portions of said bushings over said nipples thereby permanently to secure the latter to the bushings.

3. The method of securing a lubricant receiving fitting in the oil hole of a bearing, which comprises driving the shank of a bushing into said hole, forcing a nipple into said bushing, and crimping a portion of said bushing over a portion of said nipple.

4. The method of securing lubricant receiving fittings to lubricant passageways, which comprises connecting an adapter element to a lubricant passageway, driving a nipple element into sealing engagement with said adapter, and simultaneously crimping a portion of one of said elements into engagement with a portion of the other.

5. A bushing for securing a nipple to a bearing in lubricant pressure transmitting relationship thereto, comprising a body portion having a recess therein adapted to receive a portion of a lubricant receiving nipple, a shank portion adapted to be driven into the oil hole of a bearing thereby to retain and seal the bushing in the bearing, and a deformable portion adapted to be bent over a part of the nipple thereby to secure the nipple to the bushing.

6. Means for securing a lubricant receiving fitting to a bearing comprising a member having a portion thereof adapted to be forced into the oil hole of a bearing, said portion having a plurality of annular ridges substantially saw-toothed in cross-section and spaced a short distance apart, said ridges being of comparatively soft material and of greater outside diameter than the diameter of the oil hole in which the portion is to be inserted, whereby said portion may be driven into the oil hole, having said ridges deform to the shape of the hole and be wedged therein.

7. A bushing for securing a nipple to a bearing in lubricant pressure transmitting relationship thereto, comprising a body portion having a recess therein adapted to receive the shank portion of a lubricant receiving nipple, a shank portion having a plurality of saw-tooth shaped ridges and adapted to be driven into the oil hole of a bearing thereby to retain and seal the bushing in the bearing, and means for securing a nipple to the bushing.

8. The method of securing nipples to bearings having oil holes of different sizes which comprises driving into the oil holes of the bearings bushings having shanks of slightly larger diameter than the oil holes of the bearings into which they are to be driven and having recesses of a standard size, driving standard lubricant receiving nipples into said recesses of said bushings and simultaneously bending portions of said bushings over said nipples thereby permanently to secure the latter to the bushings.

9. The method of securing lubricant receiving nipples in unthreaded or poorly threaded oil holes of bearings which comprises driving into the oil hole of the bearing a recessed bushing having deformable portions of its shank slightly larger than the oil hole thereby conforming said portions to the shape of the oil hole, driving the shank of a nipple into the recess of the bushing, and crimping a portion of the bushing over a portion of the nipple.

NORMAND W. MORSE.